(12) United States Patent
Dai et al.

(10) Patent No.: US 12,524,404 B2
(45) Date of Patent: Jan. 13, 2026

(54) METHOD, DEVICE, AND SYSTEM WITH PROCESSING-IN-MEMORY (PIM)-BASED HASH QUERYING

(71) Applicant: SAMSUNG ELECTRONICS CO., LTD., Suwon-si (KR)

(72) Inventors: Yuehua Dai, Xi'an (CN); Yanni Xing, Xi'an (CN); Jie Wu, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 18/345,211

(22) Filed: Jun. 30, 2023

(65) Prior Publication Data
US 2024/0012811 A1    Jan. 11, 2024

(30) Foreign Application Priority Data

Jul. 8, 2022    (CN) .......................... 202210805683.2
Mar. 17, 2023  (KR) .......................... 10-2023-0034982

(51) Int. Cl.
*G06F 16/2453*    (2019.01)
*G06F 16/22*    (2019.01)

(52) U.S. Cl.
CPC ...... *G06F 16/2453* (2019.01); *G06F 16/2255* (2019.01)

(58) Field of Classification Search
CPC ............. G06F 16/2255; G06F 16/2453; G06F 16/9014; G06F 16/90335; G06F 12/0802; G06F 12/0864; G06F 9/30029
See application file for complete search history.

(56) References Cited

U.S. PATENT DOCUMENTS 8,290,934 B2    10/2012 Stergiou et al.
9,223,711 B2 *  12/2015 Philip ................... G06F 12/082
(Continued)

FOREIGN PATENT DOCUMENTS

CN    104536958 B    4/2015
CN    109800228 A    5/2019
(Continued)

OTHER PUBLICATIONS

Zhang, Kai, et al. "A distributed in-memory key-value store system on heterogeneous CPU-GPU cluster." The VLDB Journal 26 (2017): 729-750.
(Continued)

*Primary Examiner* — Robert W Beausoliel, Jr.
*Assistant Examiner* — Cheryl M Shechtman
(74) *Attorney, Agent, or Firm* — NSIP Law

(57)    ABSTRACT

A method, device, and system with processing-in-memory (PIM)-based hash querying. A method includes, by a processing-in-memory (PIM) device, generating, corresponding to a query instruction to the PIM device from a processor exterior to the PIM device, location index indication information for a key based on a cuckoo hash table, the key, identification information of a bucket to which the key belongs, and an index vector, respectively obtained or provided from one or more devices exterior to the PIM device, and outputting the generated location index indication information for the processor to obtain the value corresponding to the key dependent on the output location index indication information, where the bucket is one of a plurality of buckets, of the cuckoo hash table, for each of which corresponding two or more keys respectively belong.

21 Claims, 9 Drawing Sheets

(56) References Cited

U.S. PATENT DOCUMENTS

| | | | |
|---|---|---|---|
| 10,067,967 B1* | 9/2018 | Bosshart | G06F 16/2255 |
| 10,218,647 B2 | 2/2019 | Wang et al. | |
| 10,222,987 B2 | 3/2019 | Brosch | |
| 11,295,206 B2 | 4/2022 | Rajamani et al. | |
| 2011/0227790 A1 | 9/2011 | Li et al. | |
| 2014/0310307 A1* | 10/2014 | Levy | H04L 49/3009 707/769 |
| 2016/0248583 A1* | 8/2016 | McClanahan | G06F 21/78 |
| 2017/0286004 A1* | 10/2017 | Hu | G11C 29/808 |
| 2017/0286005 A1* | 10/2017 | Sala | G06F 12/0864 |
| 2017/0344369 A1* | 11/2017 | Cho | G06F 12/0607 |
| 2019/0266252 A1* | 8/2019 | Breslow | G06F 16/2255 |
| 2021/0019147 A1 | 1/2021 | Studer et al. | |

FOREIGN PATENT DOCUMENTS

| | | |
|---|---|---|
| CN | 111857982 A | 10/2020 |
| CN | 113918507 B | 4/2022 |

OTHER PUBLICATIONS

Extended European search report issued on Dec. 5, 2023, in counterpart European Patent Application No. 23183617.2 (8 pages).

Nilangekar, et al. "15-740 Project Report In-Memory Data Filtering for Cuckoo Hashing" https://www.cs.cmu.edu/afs/cs/academic/class/15740-s18/www/poster/pim (2018) pp. 1-14.

Breslow, Alex D., et al. "Horton Tables: Fast Hash Tables for In-Memory Data-Intensive Computing." *2016 USENIX Annual Technical Conference (USENIX ATC* 16). 2016. pp. 1-14.

Zhang, Kai, et al. "Mega-KV: A Case for GPUs to Maximize the Throughput of In-Memory Key-Value Stores." *Proceedings of the VLDB Endowment* vol. 8 No. 11 (2015): 1226-1237.

Lee, Sukhan, et al. "Hardware architecture and software stack for PIM based on commercial DRAM technology: Industrial product." *2021 ACM/IEEE 48th Annual International Symposium on Computer Architecture (ISCA).* IEEE, Aug. 4, 2021. pp. 43-56.

* cited by examiner

METHOD, DEVICE, AND SYSTEM WITH PROCESSING-IN-MEMORY (PIM)-BASED HASH QUERYING

CROSS-REFERENCE TO RELATED APPLICATIONS

This application claims the benefit under 35 USC § 119(a) of Chinese Patent Application No. 202210805683.2 filed on Jul. 8, 2022, in the China National Intellectual Property Administration, and Korean Patent Application No. 10-2023-0034982, filed on Mar. 17, 2023, in the Korean Intellectual Property Office, the entire disclosures of which are incorporated herein by reference for all purposes.

BACKGROUND

1. Field

The disclosure relates to a method, device, and system with processing-in-memory (PIM)-based hash querying.

2. Description of Related Art

An in-memory key-value (IMKV) store (or database) is used in applications such as data centers and cloud computing due to its high throughput and low latency time. Representative systems include open-source systems (e.g., Memcached, a remote dictionary server (Redis), random access memory (RAM) Cloud, etc.), and are also applied to core components of internet service systems (e.g., Facebook, YouTube, Twitter, etc.). Cuckoo hashing is used in IMKV store as cuckoo hashing may provide fast parallel indexing.

Cuckoo hashing is an open-addressable hash table that typically includes multiple hash functions providing multiple possible locations for each key to resolve hash collisions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes, by a processing-in-memory (PIM) device, generating, corresponding to a query instruction to the PIM device from a processor exterior to the PIM device, location index indication information for a key based on a cuckoo hash table, the key, identification information of a bucket to which the key belongs, and an index vector, respectively obtained or provided from one or more devices exterior to the PIM device, and outputting the generated location index indication information for the processor to obtain the value corresponding to the key dependent on the output location index indication information, where the bucket is one of a plurality of buckets, of the cuckoo hash table, for each of which corresponding two or more keys respectively belong.

The cuckoo hash table may include at least a portion of another cuckoo hash table that may include two or more key-value pairs for each of the plurality of buckets.

Each of the plurality of buckets may include the corresponding two or more keys but may not include corresponding key-value pairs.

The generating of the location index indication information may include locating the bucket in the cuckoo hash table dependent on the cuckoo hash table and the identification information of the bucket, identifying location information of the key within the bucket dependent on the key and the located bucket, and generating the location index indication information dependent on the identified location information and the index vector.

The identifying of the location information may include performing an exclusive-NOR (XNOR) operation on the key and each key in the located bucket.

The generating of the location index indication information may include performing a multiplication operation on the identified location information and the index vector.

The outputting of the location index indication information may include transmitting a location index indication value or a location index indication vector, as the generated location index indication information, to the processor for the processor to respectively directly obtain the value based on the transmitted location index indication value or obtain the value based on a calculation of the location index indication value from the transmitted location index indication vector.

The PIM device and the processor may be included in an electronic device or system, and the one or more devices exterior to the PIM device may include the processor, and wherein the method may further include, by the processor, transmitting the query instruction to the PIM device, and obtaining the value based on the transmitted location index indication value or the transmitted location index indication vector.

A length of the index vector may be equal to a bank length of each of one or more memory banks of the PIM device.

The method may further include receiving the cuckoo hash table transmitted from the processor, and respectively storing different portions of the cuckoo hash table in one or more memory banks of the PIM device.

The respective storing may be performed before receipt of the query instruction by the PIM device from the processor.

In one general aspect, provided is a non-transitory computer-readable storage medium storing instructions that, when executed by one or more PIM processor, of each of one or more PIM devices, cause the one or more PIM processor to collectively or individually perform, as well as in parallel, any one or any combination of two or more or all operations and/or methods described herein. In one general aspect, provided is a non-transitory computer-readable storage medium storing instructions that, when executed by a processor, cause the processor to perform any one or any combination of two or more or all operations and/or methods described herein with respect to operations of an electronic device or system and interactions with the PIM device(s), as well as control of such PIM device operation.

In one general aspect, an electronic device or system includes a processing-in-memory (PIM) device that includes one or more PIM memories and a PIM processor configured to generate, corresponding to a query instruction to the PIM device from a processor exterior to the PIM device, location index indication information for a key based on a cuckoo hash table, the key, identification information of a bucket to which the key belongs, and an index vector, respectively obtained or provided from one or more devices exterior to the PIM device, and output the generated location index indication information for the processor to obtain the value corresponding to the key dependent on the output location index indication information, where the bucket is one of a plurality of buckets, of the cuckoo hash table, for each of which corresponding two or more keys respectively belong.

The cuckoo hash table may include at least a portion of another cuckoo hash table that may include two or more key-value pairs for each of the plurality of buckets.

Each of the plurality of buckets may include the corresponding two or more keys but may not include corresponding key-value pairs.

For the generating of the location index indication information, the PIM processor may be configured to locate the bucket in the cuckoo hash table dependent on the cuckoo hash table and the identification information of the bucket, identify location information of the key within the bucket dependent on the key and the located bucket, and generate the location index indication information dependent on the identified location information and the index vector.

For the identifying of the location information, the PIM processor may be configured to perform an exclusive-NOR (XNOR) operation on the key and each key in the located bucket.

For the generating of the location index indication information, the PIM processor may be configured to perform a multiplication operation on the identified location information and the index vector.

The PIM processor may be configured to perform the outputting of the location index indication information through a transmission of a location index indication value or a location index indication vector, as the generated location index indication information, to the processor for the processor to respectively directly obtain the value based on the transmitted location index indication information or obtain the value based on a calculation of the location index indication value from the transmitted location index indication vector.

A length of the index vector may be equal to a bank length of each of the one or more PIM memories, as memory banks of the PIM device.

The PIM processor may be further configured to receive the cuckoo hash table transmitted from the processor and respectively store different portions of the cuckoo hash table in the one or more PIM memories, as memory banks of the PIM device.

The PIM device may further include another of the PIM processor, the PIM processor may correspond to a first channel and may be connected to a first memory bank, of the PIM device, in the first channel and may store a first portion of the cuckoo hash table that may include less than all of the plurality of buckets, the other PIM processor may correspond to a second channel and may be connected to a second memory bank, of the PIM device, in the second channel and may store a different second portion of the cuckoo hash table that may include less than all of the plurality of buckets, the PIM device may be further configured to operate the PIM processor and the other PIM processor in parallel for respectively performing the generating of the location index indication information and the outputting of the generated location index indication of the PIM processor and the other PIM processor, and, when the bucket is included in the first memory bank, the PIM processor may generate the location index indication information and output the generated location index indication information, and when the bucket is included in the second memory bank, the other PIM processor generates the location index indication information and outputs the generated location index indication information.

Each of the first and second portions of the cuckoo hash table may include respective multiple keys in respective buckets but may not include corresponding key-value pairs.

In one general aspect, an electronic device includes a processing-in-memory (PIM) device includes a PIM processor and one or more memory banks, where the PIM device is configured to receive a query instruction of a value corresponding to a key to be queried, obtain a hash key table includes plural keys, and generate location index indication information of the key with respect to the hash key table in response to the query instruction, and a processor, exterior to the PIM device, configured to provide the query instruction to the PIM device, and obtain a value corresponding to the key dependent on the generated location index indication information, where the hash key table is a hash table that comprises the plural keys, without corresponding key-value pairs, having been separated from the corresponding key-value pairs included another hash table.

Other features and aspects will be apparent from the following detailed description, the drawings, and the claims.

Figure 1:
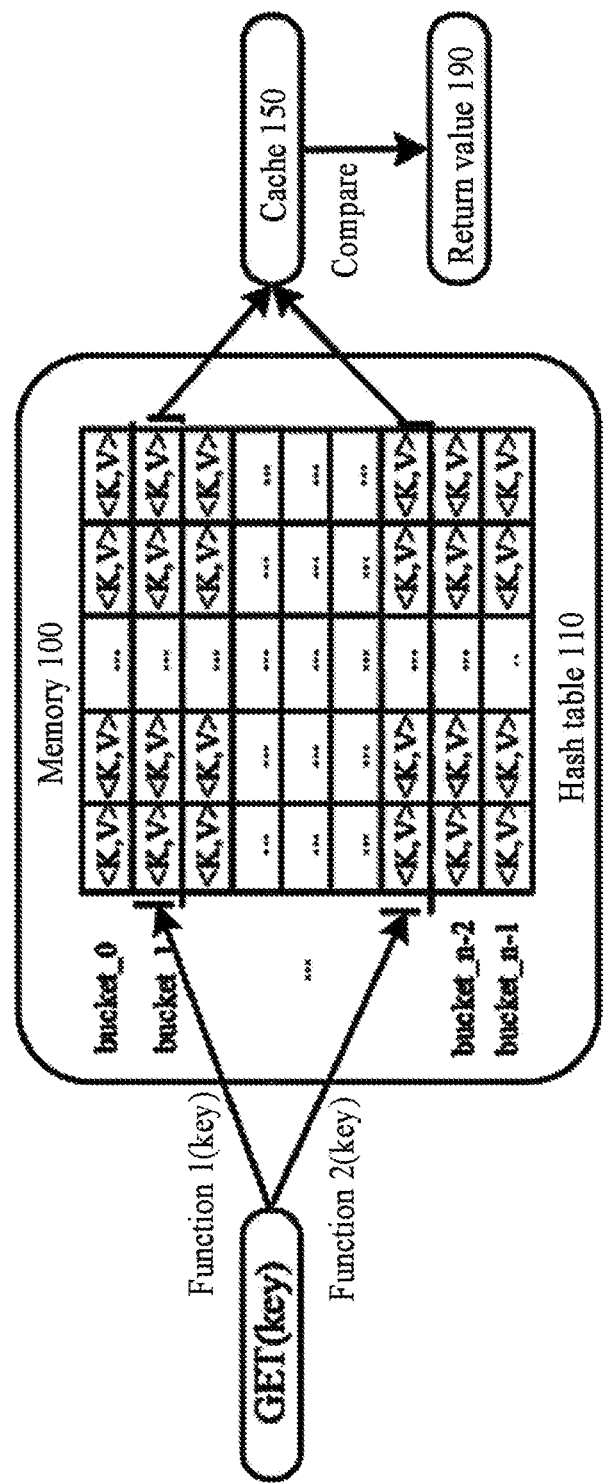
FIG. 1 illustrates an example of a lookup operation of a cuckoo hash using two hash functions.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

With respect to the expression "configured to" in the context of a configuration of a processor, as non-limiting examples, the processor in the expressions "a processor configured to A, B, and/or C" or "a processor configured to perform A, B, and/or C" may be a dedicated processor (e.g., an embedded processor) for performing the corresponding operation or a general-purpose processor (e.g., a central processing unit (CPU) or an application processor (AP)) that executes instructions, e.g., stored in a memory, that when executed configure the processor to perform corresponding operations.

Unless otherwise defined, all terms, including technical and scientific terms, used herein have the same meaning as commonly understood by one of ordinary skill in the art to which this disclosure pertains and specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

FIG. 1 illustrates an example of a lookup operation of a cuckoo hash using two hash functions.

Each row of a hash table 110 may be represented as a bucket. In FIG. 1, n buckets of a first bucket (bucket_0) to an n-th bucket (bucket_n−1) are illustrated as an example. Here, n is an integer that is equal to or greater than "1". Each bucket may include multiple key-value pairs each including a key (K) and a corresponding value (V). Among the multiple key-value pairs, each key or each key-value pair may correspond to a piece of location index information. A lookup operation of a cuckoo hash may be, for example, a GET operation. A GET function (e.g., GET(key)) is a function that receives a key as a factor and returns a value corresponding to the key (e.g., a value paired with the corresponding key), and an operation corresponding to the GET function may be referred to as a GET operation. When performing the GET operation, a processor may return a value (e.g., a return value 190) corresponding to the key to be queried based on the location index information of the found key.

According to the example of FIG. 1, when the processor performs the GET operation of the cuckoo hash, the demand for memory reading when reading the hash table 110 may be too high due to the randomness of the hash table 110. In addition, as the size of the hash table 110 increases, attempts to query the key-value pairs that are not in a cache 150 may increase. Since a cache miss may increase, a cache hit ratio of the processor may gradually decrease, and a global memory access may become frequent. In addition, as the number of queries increases, bandwidth requirements for a memory 100 of the processor may also increase. Due to the factors described above, the lookup speed of the hash table 100 may be limited.

Figure 2:
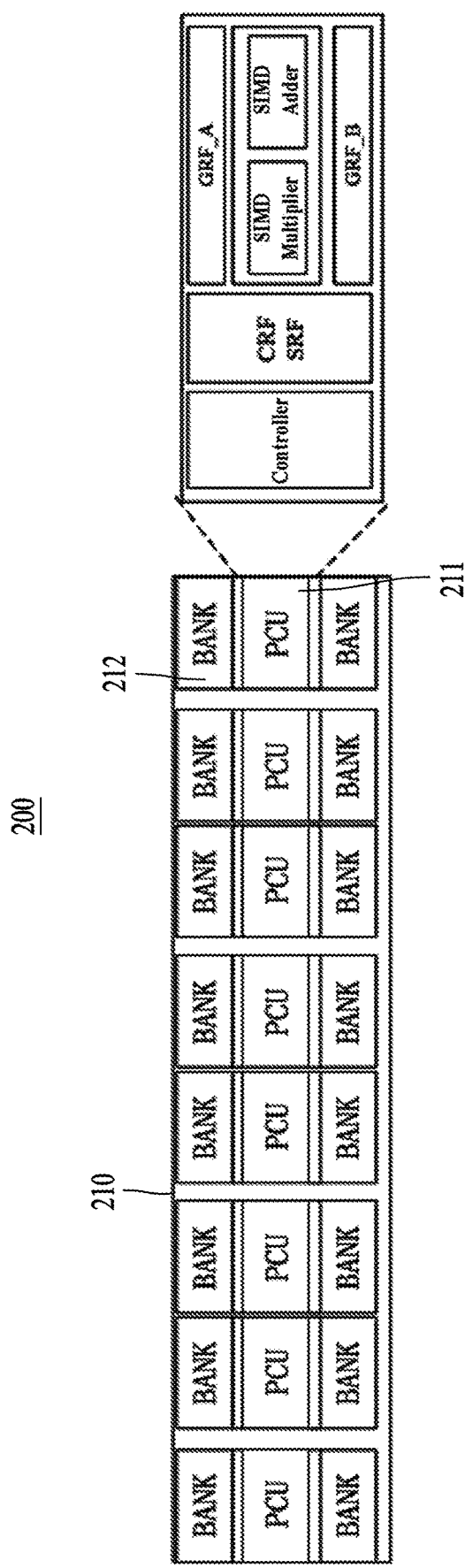
FIG. 2 illustrates an example of one channel of a processing in-memory (PIM) device, according to one or more embodiments.

FIG. 2 illustrates an example of one channel of a processing-in-memory PIM device (e.g., also referred to as a processor-in-memory or in-memory processing), according to one or more embodiments.

One channel 210 of a PIM device 200 may include a plurality of programmable computing units (PCUs) 211. Each PCU 211 may access a plurality of memory banks. Referring to FIG. 2, the channel 210 may include "8" PCUs 211, and each PCU 211 may access "2" memory banks 212. As non-limiting examples, a particular PCU 211 may access only such memory banks that are directly connected to the PCU (e.g., as the memory banks 212 respectively illustrated above and below each particular PCU 211 in FIG. 2), or only those memory banks of the channel 210, compared to memory banks of another channel 210. A memory device (e.g., a PIM memory) of the PIM device 200 may include the memory banks 212. The PIM device 200 is a memory with processing hardware (e.g., programmable circuitry). Herein, PCUs may also be referred to as processors. Referring to FIG. 2, such processing hardware is demonstrated as the PCU 211.

In some examples, the PIM memory or memory banks of the PIM device 200 may be dynamic random access memory (DRAM) with PCUs 211, high bandwidth memory (HBM) with PCUs 211, graphics double data rate (GDDR) with PCUs 211, or low power double data rate (LPDDR) with PCUs 211.

Each PCU 211 may include a controller (e.g., control circuitry), a single instruction multiple data (SIMD) multiplier, a SIMD adder, and a register.

The controller may control operations of the SIMD multiplier, the SIMD adder, and the register. The SIMD multiplier may perform a multiplication between data. The SIMD adder may perform an addition between data. As a non-limiting example, the controller may be configured to execute instructions, which may configure the controller to control the respective operations of the SIMD multiplier, the SIMD adder, and the register, as well as the respective interaction (e.g., storing in or out of information, or sharing of information) among the controller, the SIMD multiplier, the SIMD adder, and the register.

The register of each PCU 211 may include, for example, "3" types of register files. The register may include a first register file (e.g., a command register file (CRF)), a second register file (e.g., a scalar register file (SRF)), and a third register file (e.g., a general-purpose register file). The general-purpose register file may include a first general-purpose register file (GRF) (GRF_A) and a second GRF (GRF_B). However, the types of register files included in a PCU 211 are not limited thereto, and an additional type is described with respect to FIG. 5A below.

For reference, in FIG. 2, one channel is illustrated to describe the PIM device 200, but examples are not limited thereto. According to an example, one PIM device 200 may include a plurality of channels. For example, the PIM device 200 including "16" channels and having "8" PCUs per channel may query "128" keys in parallel. This greatly speeds up a large-scale key-value (KV) lookup.

According to an example, such parallel processing of the PCUs in the PIM device may be used to speed up a query of the hash table 110 of FIG. 1.

Figure 3:
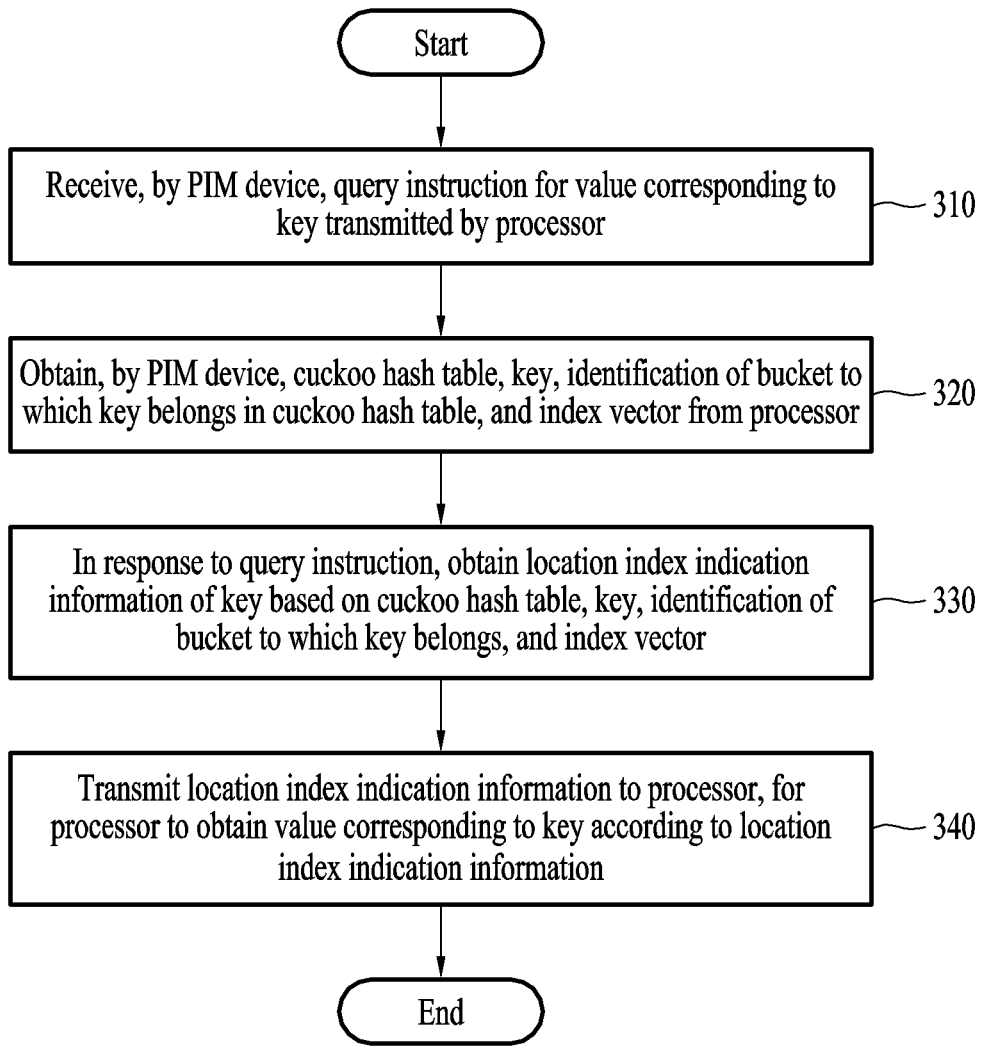
FIG. 3 illustrates an example method with PIM device-based cuckoo hash querying, according to one or more embodiments.

FIG. 3 illustrates an example method with PIM device-based cuckoo hash querying, according to one or more embodiments.

In operation 310, a PIM device may receive a query instruction of a value, corresponding to a key, transmitted by a processor, e.g., a processor exterior to the PIM device. For example, the processor may be a central processing unit (CPU), a graphics processing unit (GPU), or a neural processing unit (NPU), noting that examples are not limited thereto. In an example, each of CPU, the GPU, and the NPU may at one time act as the processor and send respective query instructions of values to the PIM device, or respective PIM devices. As a non-limiting example, the PIM device and corresponding PCU processor may respectively correspond to any of the PIM devices and PCUs described herein, as non-limiting examples.

The parallel computing feature of the PIM device may be used to speed up a cuckoo hash query. When the processor performs a GET operation, the processor may copy a cuckoo hash table of the GPU to the PIM device. Then, the processor may determine an identification of a bucket to which a key belongs from the cuckoo hash table copied to the PIM device. The processor may determine an index vector according to the hardware characteristic (e.g., the bank length) of the PIM device. The processor may generate the query instruction that instructs the PIM device to perform the cuckoo hash query. The PIM device may execute the query instruction generated by the processor. For example, the PIM device may only be used to execute the query instruction.

The value of the index vector may depend on the bank length of a memory bank of the PIM device. The vector length of the index vector may correspond to the bank length. For example, in FIG. 2, since the bank length of the PIM device is 16 bits, the index vector may be [1, 2, 3, 4, 5, 6, 7, 8, 9, 10, 11, 12, 13, 14, 15, 16]. Examples include PIM devices with different bank lengths, and thus, with such different bank lengths, the corresponding length of the respective index vector will similarly be different. For example, an electronic device example may include multiple PIM devices with different bank lengths, and thus, an index vector provided to one of the PIM devices will correspond to that PIM device's bank length, and another index vector provided to another one of the PIM devices will correspond to that other PIM device's bank length Calculations of respective location index indication information will also be dependent on the respective bank length of a corresponding PIM device and the index vector corresponding to that respective bank length. Calculations of location index indication information is described in greater detail further below. Similarly, the index vector described above is only an example vector, and other vectors that may be used for subsequent calculation of location index indication information may also be used instead of the index vectors.

In an example, the query instruction may carry address information of the key to be queried, address information of the identification of the bucket to which the key to be queried belongs, and address information of the index vector. When executing the query instruction, the PIM device may read data corresponding to pieces of address information carried, included, or referenced by the query instruction from the processor dependent on the described operations performed herein. For example, a CRF of the PIM device may read and receive the query instruction from the processor.

However, examples are not limited thereto, as the query instruction itself may directly carry the key to be queried, the identification of the bucket to which the key belongs, and the index vector.

In operation 320, the PIM device may obtain, from the processor, the cuckoo hash table, the key, the identification of the bucket to which the key to be queried from the cuckoo hash table belongs, and the index vector. In an example, in order to reduce data transmission between the processor and the PIM device, the processor may copy the cuckoo hash table to the PIM device and store the cuckoo hash table in each memory bank of the PIM device when performing an initial GET operation, and then may not need to reload the cuckoo hash table for another query instruction is later received. However, examples are not limited thereto, and the cuckoo hash table may be copied to the PIM device whenever the processor performs a GET operation.

According to an example, an original hash table (e.g., an original cuckoo hash table) may include a key-value pair for each bucket. However, since a PIM memory of the PIM device may have a limited memory space, the memory space (e.g., the size of the PIM memory) of the PIM device may be insufficient to store all key-value pairs of the original hash table. The processor according to an example may transmit a cuckoo hash table, which is at least a part of the original cuckoo hash table, to the PIM device. For example, the processor may transmit a smaller cuckoo hash table (herein referred to as an 'optimized' cuckoo hash table) to the PIM device. The processor of an electronic device that includes the PIM device, or a processor of the PIM device, may separate keys from a larger cuckoo hash table that includes both keys and values, and generate the optimized cuckoo hash table that may include the keys (e.g., without the values). Alternatively, the larger cuckoo hash table may be modified to remove the values from the larger hash table to result in the generated optimized cuckoo hash table. Each bucket of the cuckoo hash table may include one or more keys, having been respectively separated from the corresponding key-value pairs of the bucket in the original larger cuckoo hash table. Said another way, each value in the key-value pairs may be excluded from this optimized cuckoo hash table. The cuckoo hash table that preserves only the key may also be referred to as a cuckoo hash key table or a cuckoo hash key set. Since the optimized cuckoo hash table maintains only the key, more hash table entries may be stored with the same capacity. For example, a cuckoo hash table before and after structure optimization is described in greater detail below with reference to FIG. 4.

Figure 4:
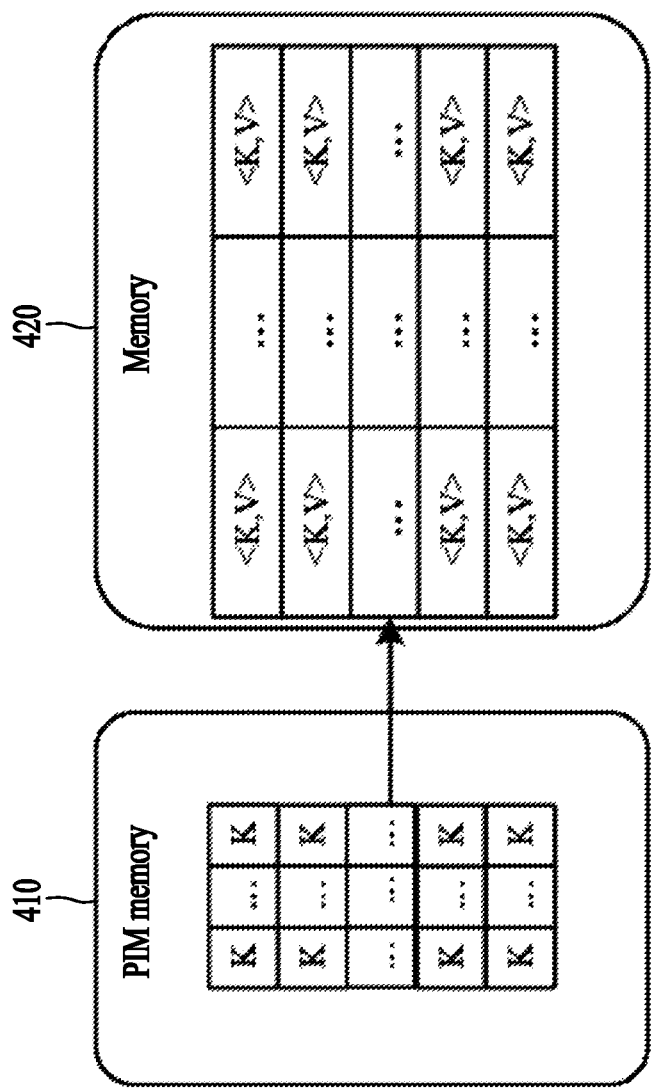
FIG. 4 illustrates an example cuckoo hash table stored in a PIM memory, according to one or more embodiments.

FIG. 4 illustrates an example cuckoo hash table stored in a PIM memory, according to one or more embodiments. The PIM device with the PIM memory may any of the PIM devices and PIM memories described herein, as non-limiting examples.

For example, when the size of a key (K in FIG. 4) is 4 bytes, the size of a value (V in FIG. 4) may be 32 bytes. After the key and the value of the hash table are separated, a hash table of 144 megabytes (MB) and a PIM memory of 16 MB before index structure optimization may be used. A PIM memory 410 may include a memory bank. As described above, a cuckoo hash key table may be stored in the PIM memory 410. An original cuckoo hash table may be stored in a memory 420. As described later, the original cuckoo hash table may be used by a processor to obtain the value (e.g., the value corresponding to a queried key) of a location index indication value determined for the cuckoo hash key table by the PIM device.

After receiving a query instruction transmitted by the processor, the PIM device may read, from the processor, the key, an identification of a bucket to which the corresponding key belongs in the cuckoo hash table, and an index vector according to address information carried in the query instruction.

The key described above may be read into an SRF from the processor by the PIM device. The index vector may be read into a GRF from the processor by the PIM device. When the bank length is fixed, the index vector may be stored in the memory bank of the PIM device when PIM hardware resource extents of the memory banks of the PIM device permit. In an example, the transmitting the index vector to the PIM device whenever a GET operation is performed may be unnecessary, and thus, in an example the index vector may not be transmitted or obtained by the PIM device, or not transmitted or obtained for every GET operation.

In operation 330, in response to the query instruction, the PIM device (e.g., a PCU) may obtain location index indication information of the key based on the cuckoo hash table, the key, the identification of the bucket to which the key belongs, and the index vector.

The PIM device may directly read from the processor according to the address information, and may also read from the processor at the right time as needed in the subsequent calculation process. There is no specific limitation on this. Therefore, the execution order of operations 320 and 330 is not limited to the order illustrated in FIG. 3, and examples exist with alternate orders of the operations 320 and 330.

In one example, in response to the query instruction, the PIM device may obtain, find, or locate the bucket in the cuckoo hash table that includes the key according to the cuckoo hash table and the identification of the bucket to which the corresponding key belongs. The PIM device may determine location information of the key in the bucket according to the key and the bucket to which this key belongs. The PIM device may determine the location index indication information of the key based on the location information of the key in the bucket to which the key belongs and the index vector.

In another example, determining the location information of the key in the bucket to which the key to be queried belongs may include performing an exclusive-NOR (XNOR) operation on the key and each key in the corresponding bucket. Determining the location index indication information of the key may include performing a multiplication operation (e.g., such as refer to MUL of FIG. 5B) on the location information of the key in the bucket to which the key belongs and the index vector.

Figure 5A:
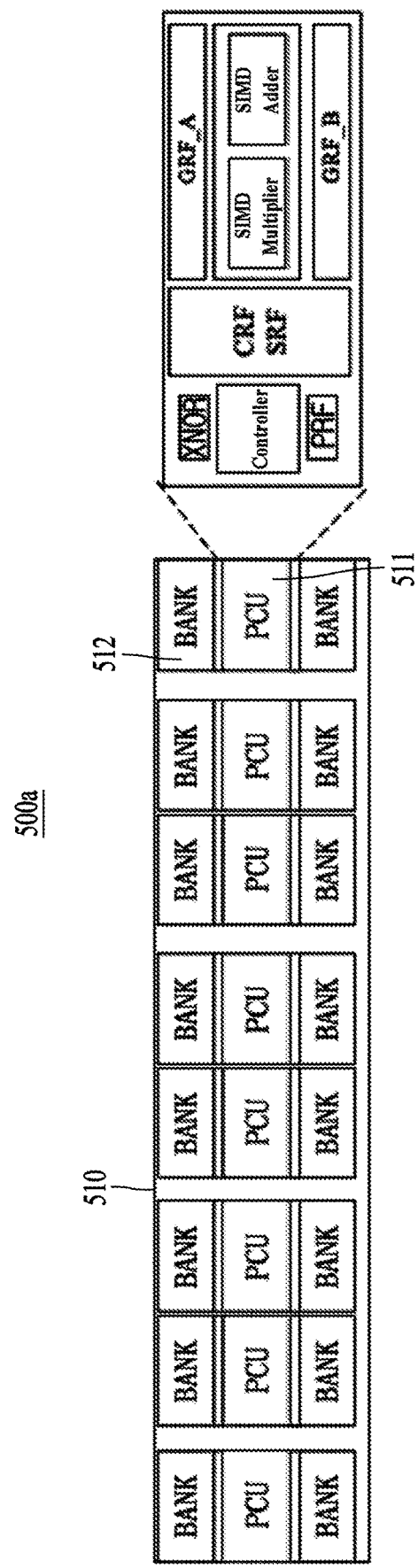
FIGS. 5A and 5B illustrate an example programmable computing unit (PCU), according to one or more embodiments.
Figure 5B:
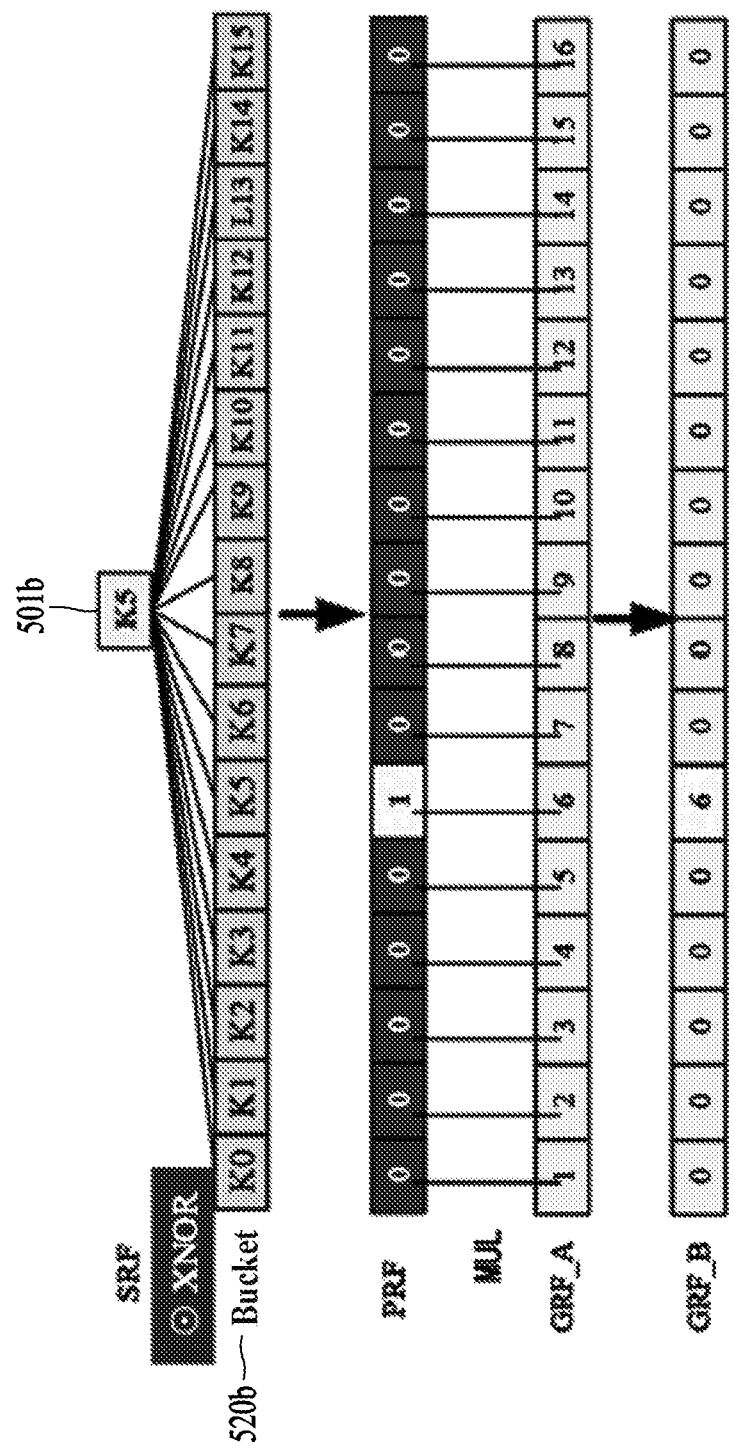

FIGS. 5A and 5B illustrate example PCUs, according to one or more embodiments.

In a PIM device 500a illustrated in FIG. 5A, a PCU 511 of a channel 510 may include a fourth register file (e.g., a predicate register file (PRF)) for supporting an XNOR operation of a key 501b and each key of a bucket 520b to which the key 501b belongs. In an example, the PIM device 500a may corresponding to any PIM device described herein, as non-limiting examples. In an example, the PCU 511 may further include the PRF, in addition to the CFR, SRF, and GRF (e.g., of the PCU 211 illustrated in FIG. 2). The PRF may store an XNOR instruction and a result of the XNOR operation.

As illustrated in FIG. 5A, a plurality of PCUs of the PIM device 500*a* may determine in parallel whether the bucket 520*b* corresponding to an identification is stored in each accessible memory bank according to the identification of the bucket 520*b*. For example, each PCU of the channel 510 of the PIM device 500*a* or all PCUs of all channels may determine in parallel whether the identified bucket 520*b* is included in a corresponding accessible memory bank. FIG. 5A illustrates an example in which the bucket 520*b* includes keys (K0 to K15) and the key 501*b* to be queried is K5.

For example, in FIG. 5A, assuming that the bucket 520*b* corresponding to the identification is stored in a memory bank 512 accessible by the PCU 511, the corresponding PCU 511 may read the bucket 520*b* corresponding to the identification into the SRF. The XNOR instruction may perform the XNOR operation on the key 501*b* and each key of the bucket 520*b* read from the memory bank 512 corresponding to the PCU 511, so that the XNOR instruction may include determining location information of the corresponding key 501*b* in the bucket 520*b* to which the key 501*b* belongs (e.g., the result of the XNOR operation) and storing the result of the corresponding XNOR operation in the PRF of the corresponding PCU 511.

In an example illustrated in FIG. 5B, the result of the XNOR operation stored in the PRF may include a value of 1 at a location corresponding to the key K5 in the bucket 520*b* and a value of 0 at the other locations. Subsequently, the PCU 511 may carry out a multiplication operation on an index vector stored in the first GRF (GRF_A) and the result of XNOR operation in the PRF to obtain location index indication information of the key and may store the location index indication information in the second GRF (GRF_B).

In an example, the location index indication information may include at least one of a location index indication vector or a location index indication value according to the hardware performance of a PIM device. For example, the second GRF (GRF_B) may store a value of "6" as the location index indication value corresponding to the key K5.

A processor exterior to the PIM device may read corresponding location index indication information from the PIM device. For example, when the location index indication information is a location index indication value, the processor may directly read the value corresponding to the key according to the corresponding location index indication value. In another example, when the location index indication information is a location index indication vector, the processor may calculate the location index indication value corresponding to the key based on the location index indication vector to obtain the value corresponding to the key. The processor reading such location index indication information obtained or generated by the PIM device may also be referred to as the PIM device outputting or transmitting the location index indication information to the processor, or the PIM device may perform such outputting or transmitting of the location index indication information without the processor reading the same from the PIM device.

Thus, as any of such examples, in operation 340, the PIM device may transmit the location index indication information to the processor so that the processor may obtain the value corresponding to the key according to the location index indication information.

Figure 6:
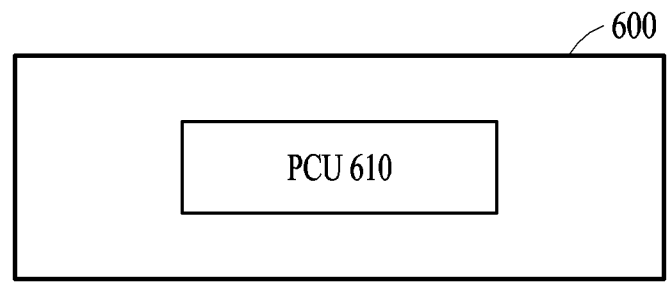
FIG. 6 illustrates an example PIM device with cuckoo hash querying, according to one or more embodiments.

FIG. 6 illustrates an example PIM device with cuckoo hash querying, according to one or more embodiments.

A PIM device 600 for performing a cuckoo hash query according to an example may include at least one PCU 610. The PIM device 600 and/or the PCU 610 may respectively correspond to any of the PIM devices and/or PCUs described herein, as non-limiting examples.

The PCU 610 may be configured to perform at least one of receiving a query instruction of a value corresponding to a key transmitted by a processor, obtaining a cuckoo hash table, the key, an identification of a bucket to which the key belongs in the cuckoo hash table, and an index vector from the processor, obtaining location index indication information of the key based on the cuckoo hash table, the key, the identification of the bucket to which the key belongs, and the index vector, in response to the query instruction, or transmitting the location index indication information to the processor, so that the processor may obtain the value corresponding to the key according to the location index indication information.

The location index indication information may be a location index indication vector or a location index indication value. In addition, the processor may transmit an optimized cuckoo hash table to a PIM device. Each bucket in the optimized cuckoo hash table (e.g., a cuckoo hash key table) may include a key but may not include a value. Therefore, the PCU may also receive the cuckoo hash table transmitted by the processor and may store the received cuckoo hash table in a memory bank of the PIM device 600.

The PCU 610 may be further configured to perform at least one of obtaining the bucket to which the key belongs according to the cuckoo hash table and the identification of the bucket to which the key belongs; determining location information of the key in the bucket to which the key belongs, according to the key and the bucket to which the key belongs; or determining the location index indication information of the key based on the location information of the key in the bucket to which the key belongs and the index vector.

In addition, the PIM device 600 for performing a cuckoo hash query according to an example may further include a PRF. The PCU 610 may be further configured to perform at least on of performing an XNOR operation on the key and each key in the bucket to which the key belongs; or performing a multiplication operation on the location information of the key in the bucket to which the key belongs and the index vector. The result of the XNOR operation may be stored in the PRF. The length of the index vector may be equal to the bank length of the PIM device 600.

The PIM device 600 may support the XNOR operation between an SRF storing the key and the memory bank of the PIM device 600. The PIM device 600 may support the multiplication operation between a first GRF (GRF_A) storing the index vector and a second GRF (GRF_B) storing the result of the XNOR operation. Subsequently, the result of the multiplication operation may be output as the location index indication information.

In addition, the GRF may support an output of 16-bit scalar. The GRF may output the location index indication information (e.g., a location index indication value) indicated by the result of the multiplication operation described above instead of the entire row data in the second GRF (GRF_B). For example, the GRF may accurately output data of the location index indication value such as "6" stored in the second GRF (GRF_B) illustrated in FIG. 5B.

Then, the processor may read the corresponding location index indication information from the PIM device 600. When the location index indication information is a location index indication value, the processor may directly read the value corresponding to the key according to the corresponding location index indication value. When the location index indication information is a location index indication vector, the processor may calculate the location index indication value corresponding to the key based on the location index indication vector to obtain the value corresponding to the key.

Figure 7A:
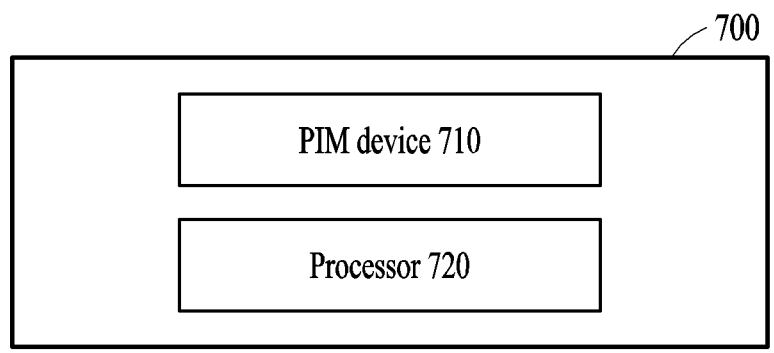
FIG. 7A illustrates an example system with PIM device-based cuckoo hash querying, according to one or more embodiments.

FIG. 7A illustrates an example system with PIM device-based cuckoo hash querying, according to one or more embodiments.

A system 700 with PIM device-based cuckoo hash querying according to an example may include a PIM device 710 and a processor 720. In an example, the PIM device 710 may correspond to any of the PIM devices described above and the processor 720 may correspond to any of the processors (e.g., exterior to any of the PIM devices) described above, as non-limiting examples.

The PIM device 710 may receive a query instruction of a value corresponding to a key transmitted by the processor 720. The PIM device 710 may obtain a cuckoo hash table, the key, an identification of a bucket to which the key belongs in the cuckoo hash table, and an index vector from the processor 720. The PIM device 710 may obtain location index indication information of the key based on the cuckoo hash table, the key, the identification of the bucket to which the key belongs, and the index vector, in response to the query instruction. The PIM device 710 may transmit the location index indication information to the processor 720, so that the processor 720 may obtain the value corresponding to the key according to the location index indication information.

Figure 7B:
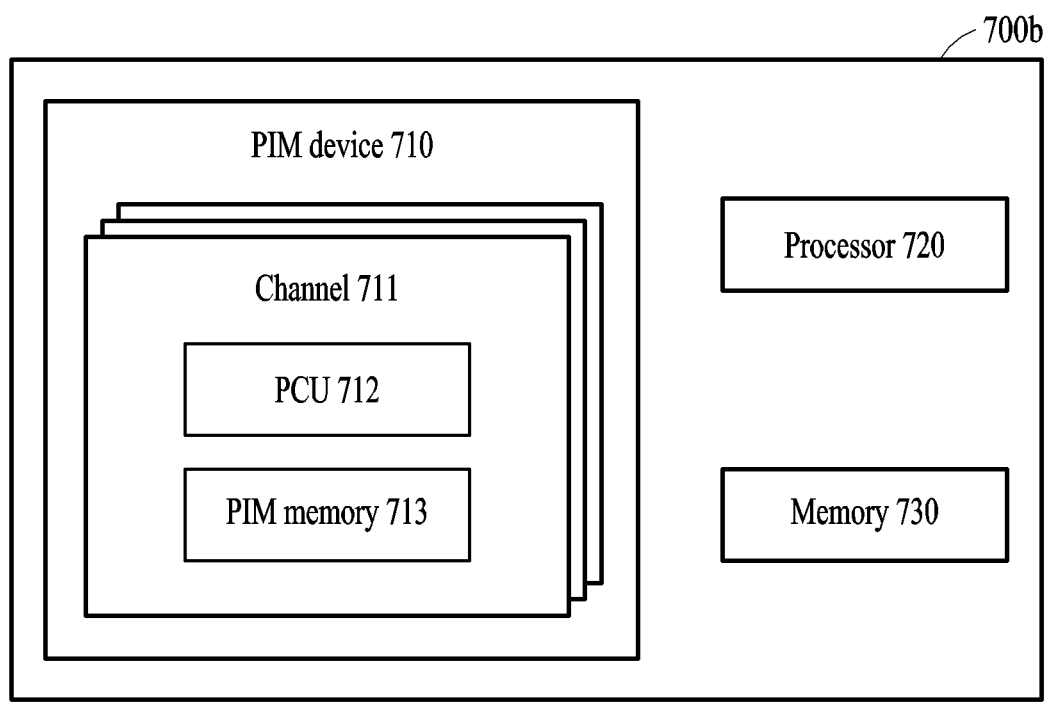
FIG. 7B illustrates an example of an electronic device with hash querying, according to one or more embodiments.

FIG. 7B illustrates an example electronic device with hash querying, according to one or more embodiments.

The electronic device 700*b* may include a PIM device 710, a processor 720, and a memory 730. In this specification, an example in which the hash query is a cuckoo hash query is mainly described, but examples are not limited thereto.

The PIM device 710 may include at least one channel 711. Each channel 711 may respectively include one or more PCUs 712 and corresponding one or more PIM memories 713 (e.g., memory banks). The PCU 712 may perform an operation for the query described above (e.g., a memory bank access, an addition, a multiplication, an XNOR operation, and the storage of operation results). The PIM memory 713 may include one or more memory banks and may temporarily store a hash table (e.g., a hash key table). The hash table may be divided into a plurality of parts and may be stored in multiple memory banks in a same channel or among memory banks among multiple channels.

For example, the PIM device 710 may receive a query instruction of a value corresponding to a key to be queried. The PIM device 710 may obtain a hash key table (e.g., a cuckoo hash key table) including keys. For example, the keys may have been separated from a key-value pair in an original hash table (e.g., an original cuckoo hash table). The PIM device 710 may store the obtained hash key table in the PIM memory 713. The PIM device 710 may determine, obtain, or generate location index indication information of the key for the hash key table, in response to the query instruction. Since determining, obtaining, or generating the location index indication information based on a corresponding bucket and an index vector by the PCU 712 is described above, it will not be described here. The PIM device 710 may transmit the location index indication information to the processor 720, again noting that such outputting or transmission may also be inclusive of examples where the processor 720 reads the location index indication information from the PIM device 710.

The processor 720 may obtain the value corresponding to the key according to the location index indication information received from the PIM device 710. For example, based on a location index indication value, the processor 720 may obtain the value corresponding to the queried key by accessing the original hash table stored in the memory 730.

Figure 8:
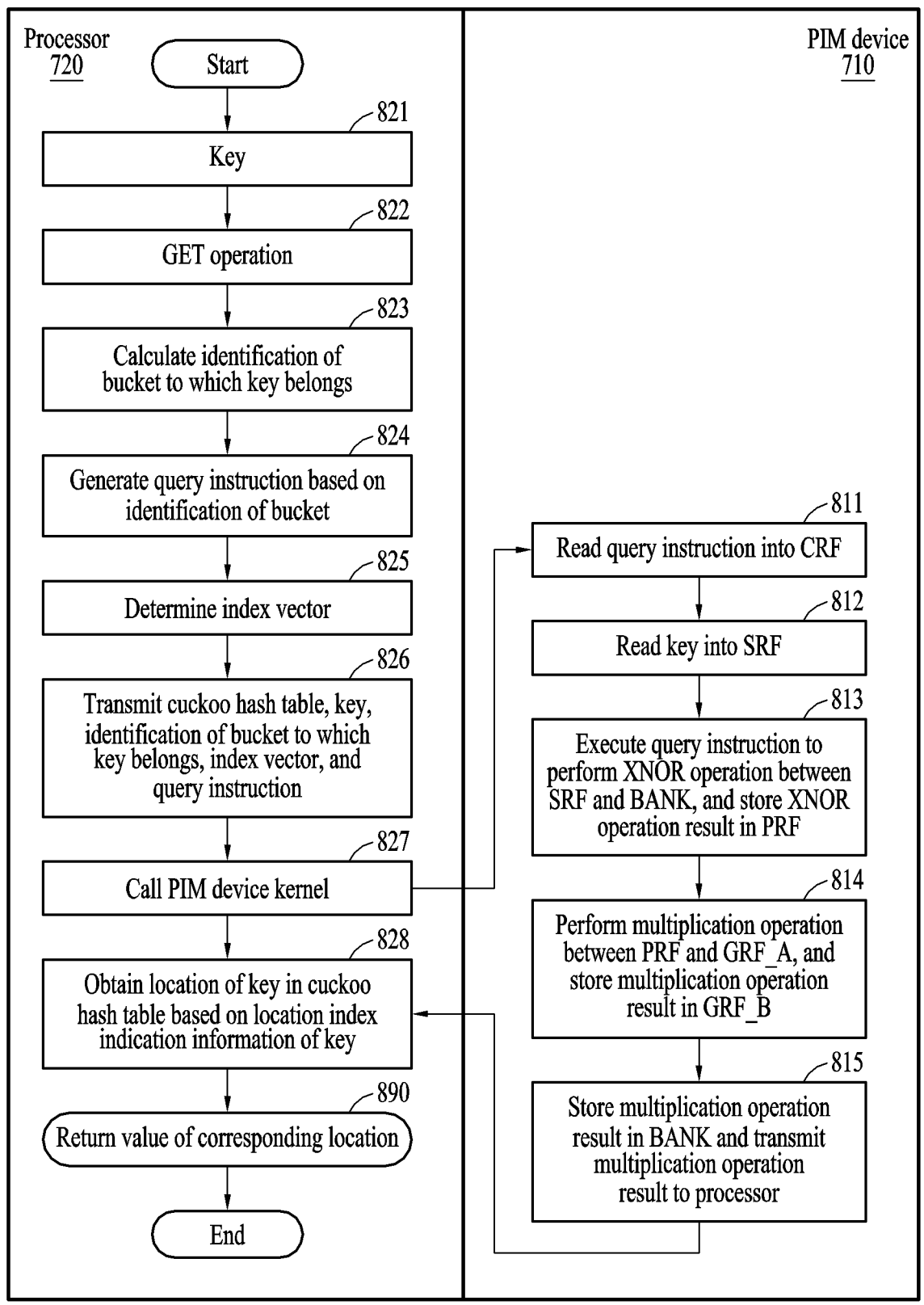
FIG. 8 illustrates an example operation of a system with PIM device-based cuckoo hash querying, according to one or more embodiments.

FIG. 8 illustrates an example operation of a system with PIM device-based cuckoo hash querying, according to one or more embodiments.

Referring to FIG. 8, the illustrated left half of the operation is performed by a processor and the illustrated right half of the operation is performed by a PIM device. Only for convenience of explanation, and noting that alternative (including any of the above PIM devices and exterior processors) are available, the below operation of the system will be described with respect to the processor 720 and the PIM device 710 of FIG. 7.

In operation 821, the processor 720 may obtain a key to be queried. In operation 822, the processor 720 may initiate a GET operation based on the key to be queried. In operation 823, the processor 720 may calculate an identification of a bucket to which the key belongs. In operation 824, the processor 720 may generate a query instruction based on the identification of the bucket to which the key belongs. In operation 825, the processor 720 may determine an index vector according to the hardware characteristic of the PIM device 710. In operation 826, the processor 720 may transmit a cuckoo hash table, the key, the identification to which the key belongs, the index vector, and the query instruction to the PIM device 710. In operation 827, the processor 720 may call a kernel of the PIM device 710.

For reference, the process (e.g., operations) of the processor 720 that transmits the hash table, the key, the identification of the bucket to which the key belongs, the index vector, and the query instruction to the PIM device 710 is described above and will not be described herein repeatedly. The cuckoo hash table transmitted from the processor 720 to the PIM device 710 may be stored in a memory bank of the PIM device 710.

In operation 811, the PIM device 710 may read the query instruction into a CRF. In operation 812, the PIM device 710 may read the key into an SRF. In operation 813, the PIM device 710 may execute the query instruction to perform an XNOR operation between the SRF and the memory bank and may store the result of the XNOR operation in a PRF. In operation 814, the PIM device 710 may perform a multiplication operation between the PRF and a first GRF (GRF_A) and may store the result of the multiplication operation in a second GRF (GRF_B). The index vector may be read into the first GRF (GRF_A). In operation 815, the PIM device 710 may store the result of the multiplication operation in the memory bank and may transmit the result of the multiplication operation to the processor 720. The result of the multiplication operation may indicate, for example, location index indication information of the key.

In operation 828, the processor 720 may obtain the location of the key in the cuckoo hash table based on the location index indication information of the key. In operation 890, the processor 720 may return the value of the obtained corresponding location (e.g., the location indicated by a location index indication value).

For example, the system 700 with the PIM device-based cuckoo hash querying may be a system on a chip (SoC) including a GPU and a PIM device, an SoC including a CPU and a PIM device, or a system including a processor and a PIM device as an independent chip or a processor-in-memory hardware.

Although the memory bandwidth between the processor 720 and a memory is limited, the operation may be performed with a relatively high bandwidth within the PIM device 710. According to an example, the PIM device 710 may perform a fast search with a high bandwidth by transmitting a memory reading operation in a cuckoo hash lookup from the processor 720 to the PIM device 710. The system 700 according to an example may solve the issue of slow searching speed of the cuckoo hash lookup and may improve the response speed of index work.

In addition, even if the number of queries continues to increase, the memory bandwidth usage rate of a GET operation according to an example may be greatly reduced compared to a previous typical situation of only using processors of a CPU, for example, through a CPU without use of a PIM device. According to an example, as the size of the hash table increases, the throughput of the GET operation may also increase greatly.

In addition, the high bandwidth of the PIM device may be fully utilized by adding a computation function (e.g., a comparison function) to the PIM device. The PIM device may be also extended to the database field, so an application field of PIM hardware may be extended. In addition, based on redesigning (e.g., optimization) of a hash table structure, the key and the value may be separated and only the key may be kept in the PIM memory. Therefore, since more information (e.g., a larger number of keys) is stored in the PIM memory of a limited size, the PIM memory may be used more reasonably.

According to an example, a non-transitory computer-readable storage medium that stores instructions may be further provided, and when the instructions are executed by at least one processor, the at least one processor may perform the PIM device-based cuckoo hash querying method according, and/or such operations involving the operations of the processor exterior to the PIM device and the interaction between such an exterior processor and the PIM device.

The processors, processing-in-memory (PIM) devices, the programmable computing unit (PCUs), the controllers, the CRF, the SRF, the GRF_A, the DRF_B, the SIMD multiplier, the SIMD adder, caches, PIM memory, XNORs, PRFs, the memory banks, and the memories, as non-limiting examples, described herein, including descriptions with respect to respect to FIGS. 1-8, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-8 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising: by a processing-in-memory (PIM) device:

generating, corresponding to a query instruction to the PIM device from a processor exterior to the PIM device, based on a cuckoo hash table, a key, identification information of a bucket in the cuckoo hash table to which the key belongs, and an index vector, location index indication information for the key, where the cuckoo hash table, the key, the identification information, and the index vector are respectively obtained or provided from one or more devices exterior to the PIM device, and where the cuckoo hash table contains only keys without corresponding values; and outputting the generated location index indication information for the exterior processor to obtain, based on the location index indication information, a value corresponding to the key where the key and the corresponding value of the key are separated from a key-value pair in another cuckoo hashing table, wherein the location index indication information generated by the PIM device allows the exterior processor retrieves actual values from the other cuckoo hash table, thereby enabling storage of a greater number of searchable keys in a limited PIM memory space and minimizing data transfer between the PIM device and the exterior processor by outputting the generated location index indication information rather than full values, wherein the bucket is one of a plurality of buckets, of the cuckoo hash table, for each of which corresponding two or more keys respectively belong, wherein the generating of the location index indication information comprises:

locating the bucket in the cuckoo hash table dependent on the cuckoo hash table and the identification information of the bucket;

identifying location information of the key within the bucket dependent on the key and the located bucket; and generating the location index indication information dependent on the identified location information and the index vector.

2. The method of claim 1, wherein the cuckoo hash table includes at least a portion of another cuckoo hash table that includes two or more key-value pairs for each of the plurality of buckets.

3. The method of claim 1, wherein the identifying of the location information comprises performing an exclusive-NOR (XNOR) operation on the key and each key in the located bucket.

4. The method of claim 1, wherein the generating of the location index indication information comprises performing a multiplication operation on the identified location information and the index vector.

5. The method of claim 1, wherein the outputting of the location index indication information includes transmitting a location index indication value or a location index indication vector, as the generated location index indication information, to the processor for the processor to respectively directly obtain the value based on the transmitted location index indication value or obtain the value based on a calculation of the location index indication value from the transmitted location index indication vector.

6. The method of claim 5, wherein the PIM device and the processor are comprised in an electronic device or system, and the one or more devices exterior to the PIM device include the processor, and wherein the method further comprises:
by the processor:
transmitting the query instruction to the PIM device; and
obtaining the value based on the transmitted location index indication value or the transmitted location index indication vector.

7. The method of claim 1, wherein a length of the index vector is equal to a bank length of each of one or more memory banks of the PIM device.

8. The method of claim 1, further comprising: receiving the cuckoo hash table transmitted from the processor, and respectively storing different portions of the cuckoo hash table in one or more memory banks of the PIM device.

9. The method of claim 8, wherein the respective storing is performed before receipt of the query instruction by the PIM device from the processor.

10. The method of claim 1, wherein each of the plurality of buckets comprises the corresponding two or more keys but does not comprise corresponding key-value pairs.

11. An electronic device or system, comprising:
a processing-in-memory (PIM) device comprising one or more PIM memories and a PIM processor configured to:
generate, corresponding to a query instruction to the PIM device from a processor exterior to the PIM device, based on a cuckoo hash table, a key, identification information of a bucket in the cuckoo hash table to which the key belongs, and an index vector, location index indication information for the key, where the cuckoo hash table, the key, the identification information, and the index vector are respectively obtained or provided from one or more devices exterior to the PIM device; and
output the generated location index indication information for the exterior processor to obtain, based on the location index indication information, a value corresponding to the key where the key and the corresponding value of the key are separated from a key-value pair in another cuckoo hash table,
wherein the bucket is one of a plurality of buckets, of the cuckoo hash table, for each of which corresponding two or more keys respectively belong,
wherein the PIM device further comprises another of the PIM processor,
where the PIM processor corresponds to a first channel and is connected to a first memory bank, of the PIM device, in the first channel and stores a first portion of the cuckoo hash table that includes less than all of the plurality of buckets,
wherein the other PIM processor corresponds to a second channel and is connected to a second memory bank, of the PIM device, in the second channel and stores a different second portion of the cuckoo hash table that includes less than all of the plurality of buckets, and
wherein the PIM device is configured to operate the PIM processor and the other PIM processor in parallel for respectively performing the generating of the location index indication information and the outputting of the generated location index indication of the PIM processor and the other PIM processor.

12. The electronic device or system of claim 11, wherein the cuckoo hash table includes at least a portion of another cuckoo hash table that includes two or more key-value pairs for each of the plurality of buckets.

13. The electronic device or system of claim 11, wherein, for the generating of the location index indication information, the PIM processor is configured to:
locate the bucket in the cuckoo hash table dependent on the cuckoo hash table and the identification information of the bucket;
identify location information of the key within the bucket dependent on the key and the located bucket; and
generate the location index indication information dependent on the identified location information and the index vector.

14. The electronic device or system of claim 13, wherein, for the identifying of the location information, the PIM processor is configured to perform an exclusive-NOR (XNOR) operation on the key and each key in the located bucket.

15. The electronic device or system of claim 13, wherein, for the generating of the location index indication information, the PIM processor is configured to perform a multiplication operation on the identified location information and the index vector.

16. The electronic device or system of claim 11, wherein the PIM processor is configured to perform the outputting of the location index indication information through a transmission of a location index indication value or a location index indication vector, as the generated location index indication information, to the processor for the processor to respectively directly obtain the value based on the transmitted location index indication information or obtain the value based on a calculation of the location index indication value from the transmitted location index indication vector.

17. The electronic device or system of claim 11, wherein a length of the index vector is equal to a bank length of each of the one or more PIM memories, as memory banks of the PIM device.

18. The electronic device or system of claim 11, wherein the PIM processor is further configured to receive the cuckoo hash table transmitted from the processor and respectively store different portions of the cuckoo hash table in the one or more PIM memories, as memory banks of the PIM device.

19. The electronic device or system of claim 11, wherein when the bucket is included in the first memory bank, the PIM processor generates the location index indication information and outputs the generated location index indication information, and when the bucket is included in the second memory bank, the other PIM processor generates the location index indication information and outputs the generated location index indication information.

20. The electronic device or system of claim 19, wherein each of the first and second portions of the cuckoo hash table include respective multiple keys in respective buckets but do not comprise corresponding key-value pairs.

21. An electronic device comprising:
a processing-in-memory (PIM) device comprising a PIM processor and one or more memory banks, where the PIM device is configured to:
receive a query instruction of a value corresponding to a key to be queried;
obtain a hash key table comprising plural keys without corresponding values; and
generate location index indication information of the key with respect to the hash key table comprising:
locate a bucket among a plurality of buckets in the hash key table;

identify location information of the key within the bucket dependent on the key and the located bucket; and generate the location index indication information dependent on the identified location information and an index vector, and a processor, exterior to the PIM device, configured to:

provide the query instruction to the PIM device; and obtain, based on the location index indication information generated by the PIM device, a value corresponding to the queried key, wherein the hash key table is a hash table that comprises the plural keys, without corresponding key-value pairs, having been separated from the corresponding key-value pairs included in another hash table, wherein the location index indication generated by the PIM device allows the exterior processor retrieves actual values from the other cuckoo hash table, thereby enables storage of a greater number of searchable keys in a limited PIM memory space and minimizes data transfer between the PIM device and the exterior processor by outputting the generated location index indication information rather than full values.

* * * * *